US009649596B2

(12) United States Patent
Chang et al.

(10) Patent No.: US 9,649,596 B2
(45) Date of Patent: May 16, 2017

(54) PEROVSKITE WITH AN OVLERLAYER SCR COMPONENT AS AN AMMONIA OXIDATION CATALYST AND A SYSTEM FOR EXHAUST EMISSION CONTROL ON DIESEL ENGINES

(71) Applicant: Johnson Matthey Public Limited Company, London (GB)

(72) Inventors: Hsiao-Lan Chang, Berwyn, PA (US); Hai-Ying Chen, Conshohocken, PA (US)

(73) Assignee: Johnson Matthey Public Limited Company, London (GB)

( * ) Notice: Subject to any disclaimer, the term of this patent is extended or adjusted under 35 U.S.C. 154(b) by 15 days.

(21) Appl. No.: 14/788,839

(22) Filed: Jul. 1, 2015

(65) Prior Publication Data
US 2016/0001228 A1    Jan. 7, 2016

Related U.S. Application Data

(60) Provisional application No. 62/020,142, filed on Jul. 2, 2014.

(51) Int. Cl.
| | |
|---|---|
| *B01D 46/00* | (2006.01) |
| *B01D 53/94* | (2006.01) |
| *B01J 35/00* | (2006.01) |
| *B01J 23/00* | (2006.01) |
| *F01N 3/28* | (2006.01) |
| *B01J 35/04* | (2006.01) |
| *B01J 23/83* | (2006.01) |
| *B01J 23/34* | (2006.01) |
| *B01J 37/02* | (2006.01) |
| *B01J 37/08* | (2006.01) |
| *B01J 37/03* | (2006.01) |
| *B01J 29/06* | (2006.01) |
| *B01J 29/85* | (2006.01) |
| *F01N 3/02* | (2006.01) |

(Continued)

(52) U.S. Cl.
CPC ......... *B01D 53/9418* (2013.01); *B01D 53/94* (2013.01); *B01D 53/9468* (2013.01); *B01D 53/9472* (2013.01); *B01J 23/002* (2013.01); *B01J 23/34* (2013.01); *B01J 23/83* (2013.01); *B01J 29/06* (2013.01); *B01J 29/064* (2013.01); *B01J 29/763* (2013.01); *B01J 29/85* (2013.01); *B01J 35/0006* (2013.01); *B01J 35/04* (2013.01); *B01J 37/0228* (2013.01); *B01J 37/0244* (2013.01); *B01J 37/0246* (2013.01); *B01J 37/038* (2013.01); *B01J 37/088* (2013.01); *F01N 3/02* (2013.01); *F01N 3/2066* (2013.01); *F01N 3/2828* (2013.01); *B01D 2255/206* (2013.01); *B01D 2255/207* (2013.01); *B01D 2255/2042* (2013.01); *B01D 2255/2045* (2013.01); *B01D 2255/2061* (2013.01); *B01D 2255/2063* (2013.01); *B01D 2255/2065* (2013.01); *B01D 2255/2073* (2013.01); *B01D 2255/2096* (2013.01); *B01D 2255/20707* (2013.01); *B01D 2255/20715* (2013.01); *B01D 2255/20723* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20776* (2013.01); *B01D 2255/20784* (2013.01); *B01D 2255/402* (2013.01); *B01D 2255/50* (2013.01); *B01D 2255/9022* (2013.01); *B01D 2255/9032* (2013.01); *B01D 2255/9035* (2013.01); *B01D 2257/406* (2013.01); *B01J 2229/186* (2013.01); *B01J 2229/42* (2013.01); *F01N 13/0097* (2014.06); *F01N 2330/06* (2013.01); *F01N 2370/04* (2013.01); *F01N 2510/06* (2013.01); *F01N 2510/063* (2013.01); *F01N 2570/18* (2013.01); *Y02T 10/24* (2013.01)

(58) Field of Classification Search
CPC .......... B01D 2255/102; B01D 2255/20; B01D 2255/207; B01D 2255/402; B01D 2255/50; B01D 2255/902; B01D 2255/9022; B01D 2255/9155; B01D 2257/404; B01D 2257/406; B01D 2258/01; B01D 53/54; B01D 53/9413; B01D 53/9436; B01D 53/9468; F01N 3/2066

See application file for complete search history.

(56) References Cited

U.S. PATENT DOCUMENTS

| | | |
|---|---|---|
| 4,010,238 A | 3/1977 | Shiraishi et al. |
| 4,085,193 A | 4/1978 | Nakajima et al. |

(Continued)

FOREIGN PATENT DOCUMENTS

CA    2512803 A1 *   2/2006   ......... B10D 53/8634

Primary Examiner — Timothy Vanoy

(57) ABSTRACT

An ammonia slip control catalyst having a layer containing perovskite and a separate layer containing an SCR catalyst is described. The ammonia slip catalyst can have two stacked layers, with the top overlayer containing an SCR catalyst, and the bottom layer containing a perovskite. The ammonia slip catalyst can alternatively be arranged in sequential layers, with the SCR catalyst being upstream in the flow of exhaust gas relative to the perovskite. A system comprising the ammonia slip catalyst upstream of a PGM-containing ammonia oxidation catalyst and methods of using the system are described. The system allows for high ammonia oxidation with good nitrogen selectivity. Methods of making and using the ammonia slip catalyst to reduce ammonia slip and selectively convert ammonia to $N_2$ are described.

20 Claims, 5 Drawing Sheets

(51) Int. Cl.
*F01N 3/20* (2006.01)
*B01J 29/064* (2006.01)
*B01J 29/76* (2006.01)
*F01N 13/00* (2010.01)

(56) References Cited

U.S. PATENT DOCUMENTS

| | | | | |
|---|---|---|---|---|
| 5,516,497 A * | 5/1996 | Speronello | ......... | B01D 53/9418 423/235 |
| 7,393,511 B2 | 7/2008 | Tran et al. | | |
| 7,410,626 B2 | 8/2008 | Tran et al. | | |
| 7,722,845 B2 * | 5/2010 | Caudle | ............ | B01J 23/42 422/168 |
| 8,202,481 B2 | 6/2012 | Nochi et al. | | |
| 8,466,083 B2 * | 6/2013 | Schmieg | ............ | B01D 53/9418 422/171 |
| 8,524,185 B2 * | 9/2013 | Caudle | ............ | B01D 53/9468 423/210 |
| 8,883,100 B2 * | 11/2014 | Paulus | ............ | B01D 53/9468 422/170 |
| 9,242,239 B2 * | 1/2016 | Fedeyko | ............ | B01J 37/0244 |
| 2007/0021294 A1 | 1/2007 | Hori et al. | | |
| 2008/0141661 A1 * | 6/2008 | Voss | ............ | B01D 53/9413 60/295 |
| 2010/0111796 A1 * | 5/2010 | Caudle | ............ | B01D 53/9468 423/239.2 |
| 2011/0138777 A1 | 6/2011 | Jen et al. | | |
| 2011/0271664 A1 * | 11/2011 | Boorse | ............ | B01D 53/9468 60/301 |
| 2012/0042631 A1 * | 2/2012 | Schmieg | ............ | B01D 53/9463 60/274 |
| 2012/0047874 A1 | 3/2012 | Schmieg et al. | | |
| 2014/0065044 A1 * | 3/2014 | Ito | ............ | B01J 35/04 423/213.5 |
| 2014/0140911 A1 | 5/2014 | Bergeal et al. | | |
| 2015/0352492 A1 * | 12/2015 | Andersen | ............ | B01D 53/8634 423/237 |
| 2016/0101413 A1 * | 4/2016 | Fedeyko | ............ | B01D 53/9436 422/171 |

* cited by examiner

Figure 1. Structure of a Perovskite
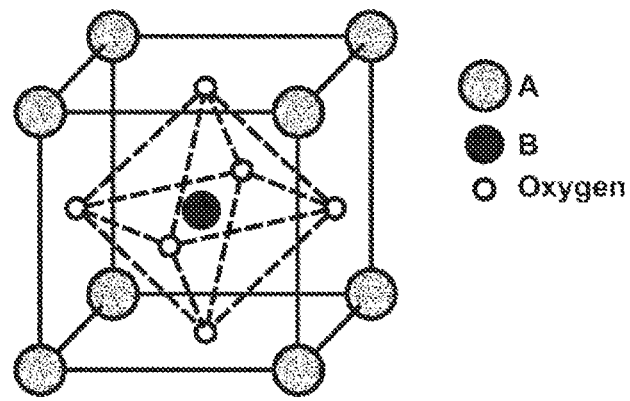
Figure 2A
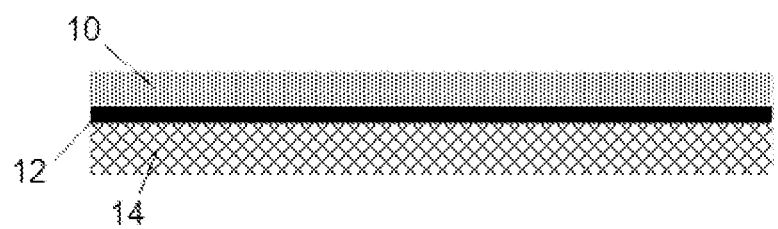
Figure 2B
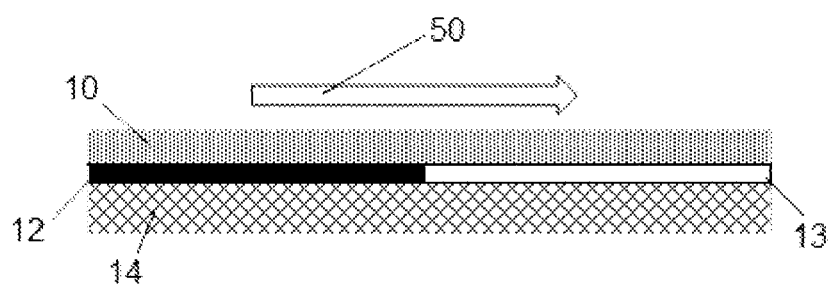
Figure 2C
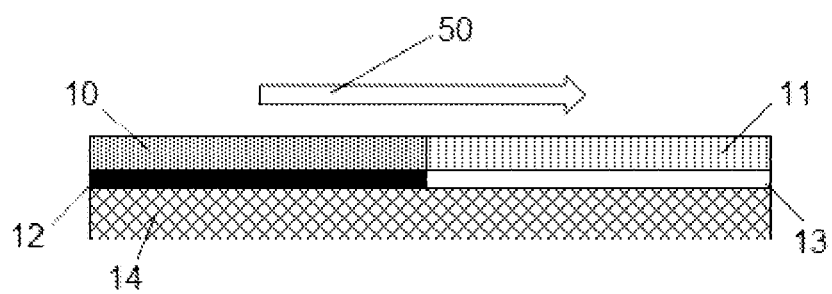

PEROVSKITE WITH AN OVLERLAYER SCR COMPONENT AS AN AMMONIA OXIDATION CATALYST AND A SYSTEM FOR EXHAUST EMISSION CONTROL ON DIESEL ENGINES

CROSS-REFERENCE TO RELATED APPLICATIONS

This application claims priority to U.S. Provisional Application No. 62/020,142, filed on Jul. 2, 2014, and is incorporated herein by reference.

FIELD OF THE INVENTION

The present invention is directed towards selective ammonia oxidation catalyst, also known as ammonia slip catalysts, and methods for removal of ammonia from exhaust gases that have been subjected to selective catalytic reduction (SCR) of oxides of nitrogen (NOx) by ammonia injection. More specifically, the present invention is directed to a composite catalyst having a layer comprising an SCR catalyst and a layer comprising a perovskite.

BACKGROUND OF THE INVENTION

Combustion of hydrocarbon-based fuel in electrical power stations and in engines produces flue or exhaust gas that contains, in large part, relatively benign nitrogen ($N_2$), water vapor ($H_2O$), and carbon dioxide ($CO_2$). But the flue and exhaust gases also contain, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of flue and exhaust gas released into the atmosphere, it is desirable to eliminate or reduce the amount of the undesirable components, preferably by a process that, in turn, does not generate other noxious or toxic substances.

Typically exhaust gases from lean burn gas engines and flue gases from electrical power stations have a net oxidizing effect due to the high proportion of oxygen that is provided to ensure adequate combustion of the hydrocarbon fuel. In such gases, one of the most burdensome components to remove is $NO_x$, which includes nitric oxide (NO), nitrogen dioxide ($NO_2$), and nitrous oxide ($N_2O$). The reduction of $NO_x$ to $N_2$ is particularly problematic because the exhaust gas contains enough oxygen to favor oxidative reactions instead of reduction. Notwithstanding, $NO_x$ can be reduced by a process commonly known as Selective Catalytic Reduction (SCR). An SCR process involves the conversion of $NO_x$, in the presence of a catalyst and with the aid of a nitrogenous reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate. The chemical equation for stoichiometric SCR reactions using ammonia is:

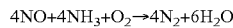

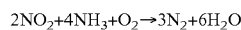

Most SCR processes utilize a stoichiometric excess of ammonia in order to maximize the conversion of NOx. Unreacted ammonia that passes through the SCR process (also referred to as "ammonia slip") is undesirable, because the released ammonia gas can negatively impact the atmosphere and can react with other combustion species. To reduce ammonia slip, SCR systems can include an ammonia oxidation catalyst (AMOX) (also known as an ammonia slip catalyst (ASC)) downstream of the SCR catalyst.

Catalysts for oxidizing excess ammonia in an exhaust gas are known. For example, U.S. Pat. No. 7,393,511 describes an ammonia oxidation catalyst containing a precious metal, such as platinum, palladium, rhodium, or gold on a support of titania alumina, silica, zirconia, etc. Other ammonia oxidation catalysts contain a first layer of vanadium oxide, tungsten oxide, and molybdenum oxide on a titania support, and a second layer of platinum on a titania support (see, e.g., U.S. Pat. Nos. 8,202,481 and 7,410,626). However, these catalysts are not highly efficient at converting ammonia, particularly at relatively low temperatures. Most of the known systems for oxidizing excess ammonia rely on expensive precious metals as a component in the oxidation catalyst. Accordingly, there remains a need in the art for improved ammonia slip catalysts. The present invention satisfies this need among others.

SUMMARY OF THE INVENTION

In one aspect of the invention, an ammonia slip catalyst comprises a first layer comprising an SCR catalyst and a second layer comprising a perovskite, wherein the first layer is arranged to contact an exhaust gas before the second layer.

In another aspect of the invention, a method for producing an ammonia slip catalyst comprises: (a) forming a bottom layer on a substrate by applying onto a substrate a bottom layer washcoat comprising a perovskite, (b) drying the bottom layer washcoat on the substrate, (c) calcining the bottom layer washcoat on the substrate; (d) forming a top layer positioned over the bottom layer by applying a top layer washcoat comprising an SCR catalyst over the calcined bottom layer formed in step (c), (e) drying the top layer washcoat on the calcined bottom layer on the substrate, and (f) calcining the top layer washcoat on the bottom layer washcoat on the substrate.

In yet another aspect of the invention, a method for reducing the concentration of ammonia in an exhaust gas stream generated by a combustion source comprises contacting an exhaust gas stream containing ammonia with an ammonia slip catalyst comprising a first layer comprising an SCR catalyst and a second layer comprising a perovskite, wherein the first layer is arranged to contact an exhaust gas before the second layer.

In still another aspect of the invention, a system comprises at least one SCR catalyst, a perovskite and a platinum group metal, wherein at least a portion of the SCR catalyst is in an overlayer arranged over a layer comprising the perovskite, and at least a portion of the SCR catalyst is in an overlayer arranged over a layer comprising the platinum group metal.

In another aspect of the invention, a catalyst article comprises: (a) a wall flow monolith having an inlet face end and an outlet face and an axis of gas flow from said inlet face to said outlet face; (b) a first composition comprising a first layer comprising a first SCR catalyst and a second layer comprising a perovskite, wherein the first layer is arranged to contact an exhaust gas before the second layer and (c) a second composition comprising a first layer comprising a second SCR catalyst and a second layer comprising a precious group metal, wherein the first layer is arranged to contact an exhaust gas before the second layer, wherein the first and second compositions are disposed within a portion of the wall flow monolith and in series along the axis, and wherein said first composition is disposed proximal to the inlet face, and the second zone is disposed proximal to the outlet face.

In yet another aspect of the invention, an engine exhaust gas treatment system comprises: (a) a catalyst article comprising: (i) a wall flow monolith having an inlet face end and an outlet face and an axis of gas flow from said inlet face to said outlet face; (ii) a first composition comprising a first layer comprising a first SCR catalyst and a second layer comprising a perovskite, wherein the first layer is arranged to contact an exhaust gas before the second layer and (iii) a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein said first composition is disposed proximal to the inlet face, and the second zone is disposed proximal to the outlet face; and (b) a source of ammonia or urea upstream of the catalytic article.

In yet another aspect of the invention, a method for treating an exhaust gas comprises contacting an exhaust gas stream having a concentration of NOx with a nitrogenous reductant at a temperature of about 150° C. to about 750° C. in the presence of a catalyst article comprising: (a) a wall flow monolith having an inlet face end and an outlet face and an axis of gas flow from said inlet face to said outlet face; (b) a first composition comprising a first layer comprising a first SCR catalyst and a second layer comprising a perovskite, wherein the first layer is arranged to contact an exhaust gas before the second layer and (c) a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein said first composition is disposed proximal to the inlet face, and the second zone is disposed proximal to the outlet face.

In still another aspect of the invention, methods for reducing NOx in an exhaust gas comprise contacting the gas with a catalyst article catalyst article comprising: (a) a wall flow monolith having an inlet face end and an outlet face and an axis of gas flow from said inlet face to said outlet face; (b) a first composition comprising a first layer comprising a first SCR catalyst and a second layer comprising a perovskite, wherein the first layer is arranged to contact an exhaust gas before the second layer and (c) a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein said first composition is disposed proximal to the inlet face, and the second zone is disposed proximal to the outlet face for a time and temperature sufficient to reduce the level of NOx compounds in the gas.

BRIEF DESCRIPTION OF THE DRAWINGS

The invention may be understood from the following detailed description when read in connection with the accompanying drawing.

FIG. 1 is a representation of the structure of a perovskite.

FIGS. 2A-2G are drawings of configurations of catalyst articles showing locations of the SCR catalysts, perovskite and platinum group metals.

DETAILED DESCRIPTION OF THE INVENTION

Figure 2D:
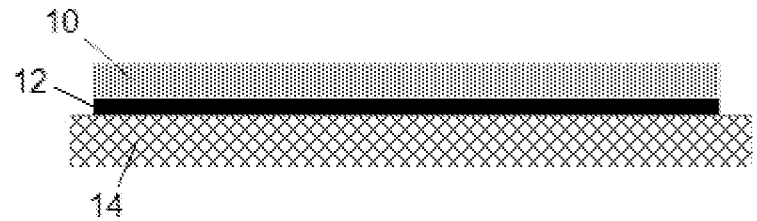

As used in this specification and the appended claims, the singular forms "a", "an" and "the" include plural referents unless the context clearly indicates otherwise. Thus, for example, reference to "a catalyst" includes a mixture of two or more catalysts, and the like.

As used herein, the term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications. Oxford (1997). XML on-line corrected version: http://goldbook.i-upac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

As used herein, the term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The term "platinum group metal" or PGM, means ruthenium, rhodium, palladium, osmium, iridium, and platinum. The phrase "does not comprise a platinum group metal" means that a platinum group metal is not added in forming the catalyst but does not preclude one or more platinum group metals being present in trace amounts, which are levels that do not have measureable catalytic activity. The compositions and methods described herein preferably do not comprise a platinum group metal.

In several aspects of the invention, an ammonia slip catalyst comprises top layer comprising an SCR catalyst and a bottom layer comprising a perovskite.

SCR Catalyst

The SCR catalyst can be an oxide of a base metal, a molecular sieve, a metal exchanged molecular sieve or a mixture thereof. The base metal can be selected from the group consisting of vanadium (V), molybdenum (Mo) and tungsten (W), chromium (Cr), cerium (Ce), manganese (Mn), iron (Fe), cobalt (Co), nickel (Ni), and copper (Cu), and mixtures thereof. SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, of which the entire contents are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. These catalysts may contain other inorganic materials such as $SiO_2$ and $ZrO_2$ acting as binders and promoters.

When the SCR catalyst is a base metal, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The at least one base metal catalyst promoter can preferably be $MnO_2$, $Mn_2O_3$, $Fe_2O_3$, $SnO_2$, CuO, CoO, $CeO_2$ and mixtures thereof. The at least one base metal catalyst promoter may be added to the catalyst in the form of a salt in an aqueous solution, such as a nitrate or an acetate. The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat. The SCR catalyst can contain from at least about 0.1 weight percent, at least about 0.5 weight percent, at least about 1 weight percent, or at least about 2 weight percent to at most about 10 weight percent, about 7 weight percent, about 5 weight percent of a promoter metal based on the total weight of the promoter metal and support.

The SCR catalyst can comprise a molecular sieve or a metal exchanged molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

A zeolitic molecular sieve is a microporous aluminosilicate having any one of the framework structures listed in the Database of Zeolite Structures published by the International Zeolite Association (IZA). The framework structures include, but are not limited to those of the CHA, AEI, FAU, BEA, MFI, MOR types. Non-limiting examples of zeolites having these structures include chabazite, SSZ-39, faujasite, zeolite Y, ultrastable zeolite Y, beta zeolite, mordenite, silicalite, zeolite X, and ZSM-5. Aluminosilicate zeolites can have a silica/alumina molar ratio (SAR defined as $SiO_2/Al_2O_3$) from at least about 5, preferably at least about 15, with useful ranges of from about 10 to 200.

As used herein, the term "non zeolitic molecular sieve" refers to corner sharing tetrahedral frameworks where at least a portion of the tetrahedral sites are occupied by an element other than silicon or aluminum. Specific non-limiting examples of non-zeolitic molecular sieves include silicoaluminophosphates such as SAPO-18, SAPO-34, SAPO-37 and SAPO-44. The silicoaluminophosphates can have framework structures that contain framework elements that are found in zeolites, such as CHA, AEI, FAU, BEA, MFI, MOR and other types described below.

The SCR catalyst can comprise a small pore, a medium pore or a large pore molecular sieve, or combinations thereof.

The SCR catalyst can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof. The SCR catalyst can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. Preferably the small pore molecular sieve is selected from the group of Framework Types consisting of CHA, LEV, AEI, AFX, ERI, SFW, KFI, DDR and ITE.

The SCR catalyst can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore molecular sieve selected from the group of Framework Types consisting of MFI, FER and STT.

The SCR catalyst can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV. IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of MOR, OFF and BEA.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zerovalent metal atoms or clusters, isolated cations, mononuclear or polynuclear oxycations, or as extended metal oxides. Preferably, the metals can be iron, copper, and mixtures or combinations thereof.

The metal can be combined with the zeolite using a mixture or a solution of the metal precursor in a suitable solvent. The term "metal precursor" means any compound or complex that can be dispersed on the zeolite to give a catalytically-active metal component. Preferably the solvent is water due to both economics and environmental aspects of using other solvents. When copper, a preferred metal is used, suitable complexes or compounds include, but are not limited to, anhydrous and hydrated copper sulfate, copper nitrate, copper acetate, copper acetylacetonate, copper oxide, copper hydroxide, and salts of copper amines (e.g. $[Cu(NH_3)_4]^{2+}$). This invention is not restricted to metal precursors of a particular type, composition, or purity. The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve.

A metal exchanged molecular sieve can contain in the range of about 0.10% and about 10% by weight of a group VB, VIB, VIIB, VIIIB, IB, or IIB metal located on extra framework sites on the external surface or within the channels, cavities, or cages of the molecular sieve. Preferably, the extra framework metal can be present in an amount of in the range of about 0.2% and about 5% by weight.

The metal exchanged molecular sieve can be a copper (Cu) supported small pore molecular sieve having from about 0.1 to about 20.0 wt. % copper of the total weight of the catalyst. Preferably copper is present from a about 1 wt. % to about 6 wt. % of the total weight of the catalyst, more preferably from about 1.8 wt. % to about 4.2 wt. % of the total weight of the catalyst.

The metal exchanged molecular sieve can be an iron (Fe) supported small pore molecular sieve having from about 0.1 to about 20.0 wt. % iron of the total weight of the catalyst. Preferably iron is present from about 1 wt. % to about 6 wt. % of the total weight of the catalyst, more preferably from about 1.8 wt. % to about 4.2 wt. % of the total weight of the catalyst.

Perovskite

As used herein, the term "perovskite" or "perovskite oxide" refers to any material with the same type of crystal structure as calcium titanium oxide ($CaTiO_3$), with the oxygen in the face centers. The general formula for perovskite compounds is $ABX_3$, where "A" and "B" are two cations of very different sizes, and X is an anion that bonds to both cations. X can be any one of a number of anions, preferably oxygen. The perovskite can contain two different metals for A, B or both A and B. When the perovskite contains two different metals for A, B or both A and B, the formula can be written as $AA'BO_3$, $ABB'O_3$, or $AA'BB'O_3$. Perovskite is characterized by a closely-packed structure that appears cubic with the larger metal ions, A, sitting at the corners of the cubic cell and the smaller metal ions, B, located at the center.

A can comprise alkali metals, alkali earth metals, or a lanthanide having atomic number 57-71 of the periodic table of elements. A can preferably be sodium (Na), calcium (Ca), strontium (Sr), barium (Ba), bismuth (Bi), cadmium (Cd), cerium (Ce), lead (Pb), yttrium (Y), lanthanum (La) and neodymium (Nd). Lanthanum and strontium are preferred. Mixtures of these elements can also be used. Examples of perovskites containing a mixture of A elements include $La_YSr_{(1-Y)}CoO_3$, and $La_YSr_{(1-Y)}MnO_3$, where Y=0.6 to 1.0, inclusive, with $La_{0.9}Sr_{0.1}MnO_3$ being a specific example.

B can comprise metals with atomic numbers in the periodic table of 21-32, 39-51, and 57-83. B can preferably be a transition metal, such as cobalt (Co), titanium (Ti), zirconium (Zr), niobium (Nb), tin (Sn), aluminum (Al), nickel (Ni), chromium (Cr), manganese (Mn), copper (Cu), iron (Fe) and scandium (Sc), a metal, such as gallium (Ga) or indium (In), a precious metal, such as platinum, palladium, rhodium, gold and silver.

Substrate

The term "substrate" refers to a substantially inert substrate material, as generally known in the art. The substrate may be of any generally suitable form. For example, the substrate may comprise a flow through monolith, such as a ceramic or honeycomb structure, or the substrate may be in the form of foams, or the substrate may be in the form of pellets, fluidized bed particulates, or may comprise particles such as spheres or short extruded segments.

The solid substrate may be any of those materials typically used for preparing exhaust gas treatment catalysts and will preferably comprise a metal or refractory ceramic having a honeycomb structure. Any suitable substrate may be employed, such as a monolithic substrate of the type having a plurality of fine, parallel gas flow passages extending there through from an inlet or an outlet face of the carrier, such that passages are open to fluid flow there through. The passages that are essentially straight paths from their fluid inlet to their fluid outlet are defined by walls on which the ammonia oxidation catalyst is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

Honeycomb substrates comprise multiple adjacent, parallel channels that generally extend from the inlet face to the outlet face of the substrate and are either open on both ends (flow-through substrates) or are capped on alternating ends in a checker-board type pattern (wall-flow filters). This geometry results in a high-surface area-to-volume ratio. Honeycomb configurations are more compact than plate types, but have higher pressure drops and plug more easily. However, for most mobile applications, preferred substrates are honeycombs. For certain applications, the honeycomb flow though monolith has a high cell density, for example about 600 to 800 cells per square inch, and/or an average internal wall thickness of about 0.02-0.35 mm, preferably about 0.05-0.20 mm. For certain other applications, the honeycomb flow through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite e.g. acicular mullite, pollucite, a thermet such as Al$_2$OsZFe, Al$_2$O$_3$/Ni or B$_4$CZFe, or composites comprising segments of any two or more thereof. Preferred materials include cordierite, silicon carbide, and alumina titanate. In certain embodiments, the substrate is inert.

Washcoat

The term "washcoat" is a term widely recognized in the art and refers to mixture of one or more a catalyst or a catalysts precursor, support materials, and optionally other materials such as binders, promoters or stabilizers.

The catalysts of the present invention can be utilized in heterogeneous catalytic reaction systems (i.e., solid catalyst in contact with a gas reactant). To improve contact surface area, mechanical stability, and fluid flow characteristics, the catalyst components can be disposed on and/or within a substrate, for example as a coating. In certain embodiments, a washcoat containing one or more of the catalyst components is applied as a coating to an inert substrate, such as corrugated metal plate or a honeycomb cordierite brick. The washcoat is preferably a solution, suspension, or slurry. Suitable coatings include surface coatings that cover a portion or the entire substrate, coatings that penetrate a portion of the substrate, coatings that permeate the substrate, or some combination thereof. In addition to the catalyst component, a washcoat can also include components, such as fillers, binders, stabilizers, rheology modifiers, and other additives, including one or more of alumina, silica, non-zeolite silica alumina, titania, zirconia, ceria. In certain embodiments, the washcoat comprises pore-forming agents such as graphite, cellulose, starch, polyacrylate, and polyethylene, and the like. These additional components do not necessarily catalyze the desired reaction, but instead improve the catalytic material's effectiveness, for example by increasing its operating temperature range, increasing contact surface area of the catalyst, increasing adherence of the catalyst to a substrate, modifying rheology for better processing, etc. Typically, metal oxide particles used as binders are distinguishable over metal oxide particles used as supports based on particle size, with the binder particles being significantly smaller relative to support particles.

A variety of deposition methods are known in the art for depositing the catalyst on the substrate. Methods for depositing the catalyst on the substrate include, for example, disposing the catalyst in a liquid vehicle to form a slurry and wetting the substrate with the slurry by dipping the substrate into the slurry, spraying the slurry onto the substrate, etc. A washcoat is typically applied to a substrate as a water-based slurry. Typically, the slurry will contain a total water content of at least 20 wt. %. Water contents of at least 30 wt. %, at least 40 wt. %, at least 50 wt. % or at least 60 wt. %, are also exemplified. The slurry coated substrate can be dried and calcined (thermally treated in presence of air or oxygen) prior to use. The temperatures and times used in calcination depend upon the components in the material to be calcined and generally are between about 400° C. to about 900° C. In applications involving the processes described herein, calcinations are generally performed at temperatures from about 500° C. to about 550° C. for about 2 to about 6 hours.

The support for the oxidation catalyst can be kneaded along with other components such as fillers, binders, and reinforcing agents, into an extrudable paste which is then extruded through a die to form a honeycomb brick. Before or after the honeycomb brick is dried and/or calcined, the metal components of the oxidation catalyst are added to either one or more portions of the brick or to the entire brick in order to form the oxidation catalyst. In other embodiments, the oxidation catalyst containing the supported metals can be incorporated into the extrudable paste prior to extrusion. The SCR catalyst can then be applied as a coating on the extruded brick containing the oxidation catalyst. Two substrate designs useful in the present invention are plate and honeycomb. Plate-type catalysts have relative lower pressure drops and are less susceptible to plugging and fouling than the honeycomb types, but plate configurations are much larger and more expensive. The plates are typically constructed of metal or corrugated metal.

In certain embodiments, the washcoat or impregnation loading on and/or within the substrate for each layer or for the combination of two or more layers is 0.1 to 8 g/in$^3$, more preferably 0.5 to 6 g/in$^3$, and even more preferably 1 to 4 g/in$^3$. In certain embodiments, the washcoat or impregnation loading on and/or within the substrate for each layer or for the combination of two or more layers is >1.00 g/in$^3$, such as >1.2 g/in$^3$, >1.5 g/in$^3$, >1.7 g/in$^3$ or >2.00 g/in$^3$ or for example 1.5 to 2.5 g/in$^3$.

An ammonia slip catalyst comprises a first layer comprising an SCR catalyst and a second layer comprising a perovskite, wherein the first layer is arranged to contact an exhaust gas before the second layer. The first layer can be an overlayer located over the second layer. The first layer can be supported on a first support material and the second layer can be supported on a second support material. The SCR catalyst can comprise an oxide of a base metal, a molecular sieve, a metal exchanged molecular sieve or a mixture thereof. The base metal can be selected from the group consisting of cerium (Ce), chromium (Cr), cobalt (Co), copper (Cu), iron (Fe), manganese (Mn), molybdenum (Mo), nickel (Ni), tungsten (W) and vanadium (V), and mixtures thereof. The SCR catalyst can comprise a metal exchanged molecular sieve where the metal is selected from the group consisting of calcium, cobalt, copper, gallium, indium, iron, nickel, silver and tin. The SCR catalyst can comprise a molecular sieve or a metal exchanged molecular sieve. The molecular sieve or the metal exchanged molecular sieve can be a small pore, medium pore, large pore or a mixture thereof. The SCR catalyst can be present at a concentration of about 0.2 to about 5.0 g/in$^3$.

The perovskite can have the formula ABO$_3$, where A comprises at least one of calcium (Ca), barium (Ba), bismuth (Bi), cadmium (Cd), cerium (Ce), copper (Cu), lanthanum (La), lead (Pb), neodymium (Nd), nickel (Ni), strontium (Sr), and yttrium (Y), and B comprises at least one of aluminum (Al), cerium (Ce), chromium (Cr), cobalt (Co), iron (Fe), manganese (Mn), niobium (Nb), tin (Sn), titanium (Ti) and zirconium (Zr). The perovskite can have the formula LaCoO$_3$, LaMnO$_3$, La$_Y$Sr$_{(1-Y)}$CoO$_3$, or La$_Y$Sr$_{(1-Y)}$MnO$_3$, where Y=0.6 to 1.0, inclusive. Preferably, the perovskite has the formula La$_Y$Sr$_{(1-Y)}$CoO$_3$, where Y=0.6 to 1.0, inclusive, and the SCR catalyst comprises a copper or iron exchanged molecular sieve. The perovskite can be present at a concentration of about 0.2 to about 5.0 g/in$^3$.

The ammonia slip catalyst can have at least 70%, at least 75%, at least 80%, at least 85% or at least 90%, N$_2$ selectivity at a temperature between about 250° C. and about 650° C.

A method of preparing an ammonia slip catalyst, comprising a first layer comprising an SCR catalyst and a second layer comprising a perovskite, wherein the first layer is arranged to contact an exhaust gas before the second layer and the first layer is an overlayer located over the second layer, comprises:

(a) forming a bottom layer on a substrate by applying onto a substrate a bottom layer washcoat comprising a perovskite, (b) drying the bottom layer washcoat on the substrate,
(c) calcining the bottom layer washcoat on the substrate;
(d) forming a top layer positioned over the bottom layer by applying a top layer washcoat comprising an SCR catalyst over the calcined bottom layer formed in step (c),
(e) drying the top layer washcoat on the calcined bottom layer on the substrate, and
(f) calcining the top layer washcoat on the bottom layer washcoat on the substrate.

The SCR catalyst can comprise an oxide of a base metal, a molecular sieve, a metal exchanged molecular sieve or a mixture thereof. The base metal can be selected from the group consisting of cerium (Ce), chromium (Cr), cobalt (Co), copper (Cu), iron (Fe), manganese (Mn), molybdenum (Mo), nickel (Ni), tungsten (W) and vanadium (V), and mixtures thereof. The SCR catalyst can comprise a metal exchanged molecular sieve where the metal is selected from the group consisting of calcium, cobalt, copper, gallium, indium, iron, nickel, silver and tin. Preferably, the SCR catalyst can comprise a molecular sieve or a metal exchanged molecular sieve. The molecular sieve or the metal exchanged molecular sieve can be small pore, medium pore, large pore or a mixture thereof. The SCR catalyst can be present at a concentration of about 0.2 to about 5.0 $g/in^3$.

The perovskite can have the formula $ABO_3$, where A comprises at least one of calcium (Ca), barium (Ba), bismuth (Bi), cadmium (Cd), cerium (Ce), copper (Cu), lanthanum (La), lead (Pb), neodymium (Nd), nickel (Ni), strontium (Sr), and yttrium (Y), and B comprises at least one of aluminum (Al), cerium (Ce), chromium (Cr), cobalt (Co), iron (Fe), manganese (Mn), niobium (Nb), tin (Sn), titanium (Ti) and zirconium (Zr). The perovskite can have the formula $LaCoO_3$, $LaMnO_3$, $La_YSr_{(1-Y)}CoO_3$, or $La_YSr_{Z(1-y)}MnO_3$, where Y=0.6 to 1.0, inclusive. The perovskite can have the formula $La_YSr_{(1-Y)}CoO_3$, where Y=0.6 to 1.0, inclusive, and the SCR catalyst comprises a copper or iron SAPO-34 or a copper or iron exchanged molecular sieve. The perovskite can be present at a concentration of about 0.2 to about 5.0 $g/in^3$.

A method of reducing the concentration of ammonia in an exhaust gas stream generated by a combustion source comprises contacting an exhaust gas stream containing ammonia with an ammonia slip catalyst comprising a first layer comprising an SCR catalyst and a second layer comprising a perovskite, wherein the first layer is arranged to contact an exhaust gas before the second layer. The first layer can be an overlayer located over the second layer. The first layer can be supported on a first support material and the second layer can be supported on a second support material.

The SCR catalyst can comprise an oxide of a base metal, a molecular sieve, a metal exchanged molecular sieve or a mixture thereof. The base metal can be selected from the group consisting of cerium (Ce), chromium (Cr), cobalt (Co), copper (Cu), iron (Fe), manganese (Mn), molybdenum (Mo), nickel (Ni), tungsten (W) and vanadium (V), and mixtures thereof. Preferably, the SCR catalyst comprises a molecular sieve or a metal exchanged molecular sieve. The molecular sieve or the metal exchanged molecular sieve can be small pore, medium pore, large pore sieve or a mixture thereof. The SCR catalyst can comprise a metal exchanged molecular sieve, where the metal is selected from the group consisting of calcium, cobalt, copper, gallium, indium, iron, nickel, silver and tin. The SCR catalyst can be present at a concentration of about 0.2 to about 5.0 $g/in^3$.

The perovskite can have the formula $ABO_3$, where A comprises at least one of calcium (Ca), barium (Ba), bismuth (Bi), cadmium (Cd), cerium (Ce), copper (Cu), lanthanum (La), lead (Pb), neodymium (Nd), nickel (Ni), strontium (Sr), and yttrium (Y), and B comprises at least one of aluminum (Al), cerium (Ce), chromium (Cr), cobalt (Co), iron (Fe), manganese (Mn), niobium (Nb), tin (Sn), titanium (Ti) and zirconium (Zr). The perovskite can have the formula $LaCoO_3$, $LaMnO_3$, $La_YSr_{(1-Y)}CoO_3$, or $La_YSr_{(1-y)}MnO_3$, where Y=0.6 to 1.0, inclusive. Preferably, the perovskite has the formula $La_YSr_{(1-Y)}CoO_3$, where Y=0.6 to 1.0, inclusive, and the SCR catalyst comprises a copper or iron SAPO-34 or a copper or iron exchanged zeolite. The perovskite can be present at a concentration of about 0.2 to about 5.0 $g/in^3$.

The ammonia slip catalyst can have at least 70%, at least 75%, at least 80%, at least 85% or at least 90%, $N_2$ selectivity at a temperature between about 250° C. and about 650° C.

A system comprises at least one SCR catalyst, a perovskite and a platinum group metal, wherein at least a portion of the SCR catalyst is in an overlayer arranged over a layer comprising the perovskite, and at least a portion of the SCR catalyst is in an overlayer arranged over a layer comprising the platinum group metal. The SCR catalyst in the overlayer arranged over a layer comprising the perovskite, and the SCR catalyst in an overlayer arranged over a layer comprising the platinum group metal can be the same SCR catalyst. The SCR catalyst in the overlayer arranged over a layer comprising the perovskite, and the SCR catalyst in an overlayer arranged over a layer comprising the platinum group metal can be in a single layer over both the perovskite layer and the platinum group metal layer. The SCR catalyst in the overlayer arranged over a layer comprising the perovskite, and the SCR catalyst in an overlayer arranged over a layer comprising the platinum group metal are located on separate catalyst articles located adjacent to each other such that the flow of exhaust gas first passes through an article comprising the SCR catalyst in the overlayer arranged over a layer comprising the perovskite and then passes through an article comprising the SCR catalyst in the overlayer arranged over a layer comprising the platinum group metal.

A catalyst article comprises: (a) a wall flow monolith having an inlet face end and an outlet face and an axis of gas flow from said inlet face to said outlet face; (b) a first composition comprising a first layer comprising a first SCR catalyst and a second layer comprising a perovskite, wherein the first layer is arranged to contact an exhaust gas before the second layer and (c) a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein said first composition is disposed proximal to the inlet face, and said second zone is disposed proximal to the outlet face. The first SCR catalyst and the second SCR catalyst can be the same SCR catalyst. The first SCR catalyst and the second SCR catalyst can be different SCR catalysts. The first and second SCR catalysts can comprise an oxide of a base metal, a molecular sieve, a metal exchanged molecular sieve or a mixture thereof. The base metal can be selected from the group consisting of cerium (Ce), chromium (Cr), cobalt (Co), copper (Cu), iron (Fe), manganese (Mn), molybdenum (Mo), nickel (Ni), tungsten (W) and vanadium (V), and mixtures thereof. Preferably at least one of the first SCR catalyst and the second SCR catalyst comprises a metal exchanged molecular sieve where the metal is selected from the group consisting of calcium, cobalt, copper, gallium, indium, iron, nickel, silver and tin. Preferably, the SCR catalyst comprises a molecular sieve or a metal exchanged molecular sieve. The molecular sieve or the metal exchanged molecular sieve can be a small pore, medium pore or large pore sieve or a mixture thereof. The first and the second SCR catalysts are each present at a concentration of about 0.2 to about 5.0 g/in$^3$.

The perovskite can have the formula ABO$_3$, where A comprises at least one of calcium (Ca), barium (Ba), bismuth (Bi), cadmium (Cd), cerium (Ce), copper (Cu), lanthanum (La), lead (Pb), neodymium (Nd), nickel (Ni), strontium (Sr), and yttrium (Y), and B comprises at least one of aluminum (Al), cerium (Ce), chromium (Cr), cobalt (Co), iron (Fe), manganese (Mn), niobium (Nb), tin (Sn), titanium (Ti) and zirconium (Zr). The perovskite can have the formula LaCoO$_3$, LaMnO$_3$, La$_Y$Sr$_{(1-Y)}$CoO$_3$, or La$_Y$Sr$_{(1-Y)}$MnO$_3$, where Y=0.6 to 1.0, inclusive. The perovskite can have the formula La$_Y$Sr$_{(1-Y)}$CoO$_3$, where Y=0.6 to 1.0, inclusive, and the SCR catalyst comprises a copper or iron exchanged molecular sieve. The perovskite is present at a concentration of about 0.2 to about 5.0 g/in$^3$.

The ammonia slip catalyst can have at least 70%, at least 75%, at least 80%, at least 85% or at least 90%, N$_2$ selectivity at a temperature between about 250° C. and about 650° C.

An engine exhaust gas treatment system comprises: (a) a catalyst article comprising: (i) a wall flow monolith having an inlet face end and an outlet face and an axis of gas flow from said inlet face to said outlet face; (ii) a first composition comprising a first layer comprising a first SCR catalyst and a second layer comprising a perovskite, wherein the first layer is arranged to contact an exhaust gas before the second layer and (iii) a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein said first composition is disposed proximal to the inlet face, and said second zone is disposed proximal to the outlet face; and (b) a source of ammonia or urea upstream of the catalytic article.

A method for treating an exhaust gas comprises contacting an exhaust gas stream having a concentration of NOx with a nitrogenous reductant at a temperature of about 150° C. to about 750° C. in the presence of a catalyst article comprising: (a) a wall flow monolith having an inlet face end and an outlet face and an axis of gas flow from said inlet face to said outlet face; (b) a first composition comprising a first layer comprising a first SCR catalyst and a second layer comprising a perovskite, wherein the first layer is arranged to contact an exhaust gas before the second layer and (c) a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein said first composition is disposed proximal to the inlet face, and said second zone is disposed proximal to the outlet face.

A method for reducing NOx in an exhaust gas comprises contacting the gas with a catalyst article comprising: (a) a wall flow monolith having an inlet face end and an outlet face and an axis of gas flow from said inlet face to said outlet face; (b) a first composition comprising a first layer comprising a first SCR catalyst and a second layer comprising a perovskite, wherein the first layer is arranged to contact an exhaust gas before the second layer and (c) a second composition comprising a first layer comprising a second SCR catalyst and a second layer comprising a precious group metal, wherein the first layer is arranged to contact an exhaust gas before the second layer; wherein the first and second compositions are disposed within a portion of the wall flow monolith and in series along the axis, and wherein said first composition is disposed proximal to the inlet face, and said second zone is disposed proximal to the outlet face for a time and temperature sufficient to reduce the level of NOx compounds in the gas.

Configurations of SCR and Oxidation Catalysts

The SCR catalyst and the oxidation catalyst can be present in a variety of configurations. FIG. 2A shows a configuration of an article in which a single SCR catalyst is present in an overlayer 10 positioned over underlayer 12 which contains a perovskite. Underlayer 12 is located on a solid support 14.

FIG. 2B shows a configuration in which a single SCR catalyst is present in an overlayer 10 over two adjacent underlayers. The direction of the exhaust gas flow is shown in item 50. The first underlayer (12) which comprises a perovskite, is located upstream of the second underlayer (13), which comprises a platinum group metal. Underlayers 12 and 13 are located on a solid support 14.

FIG. 2C shows a configuration in which a first SCR catalyst is present in a first overlayer 10 over a first underlayer 12 which comprises a perovskite, and a second SCR catalyst is present in a second overlayer 11 over a second underlayer (13) which comprises a platinum group metal, and the first SCR catalyst is located upstream of the second SCR catalyst. The direction of the exhaust gas flow is shown in item 50. Underlayers 12 and 13 are located on a solid support 14.

Figure 2E:
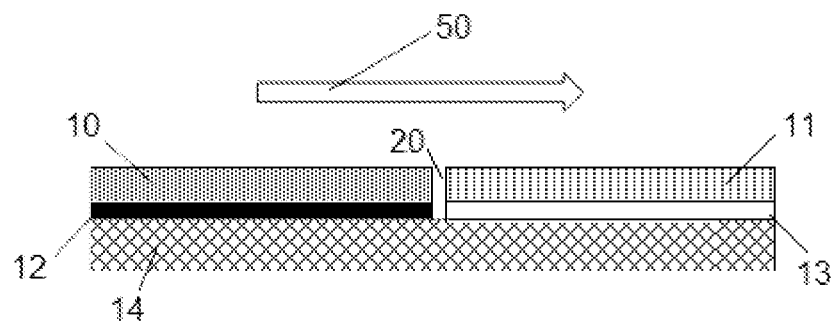
Figure 2F:
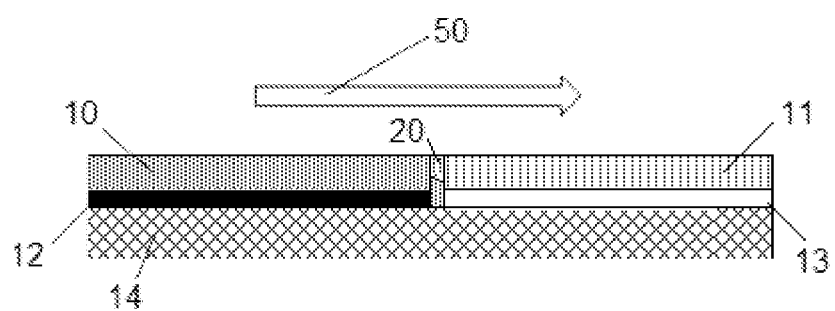
Figure 2G:
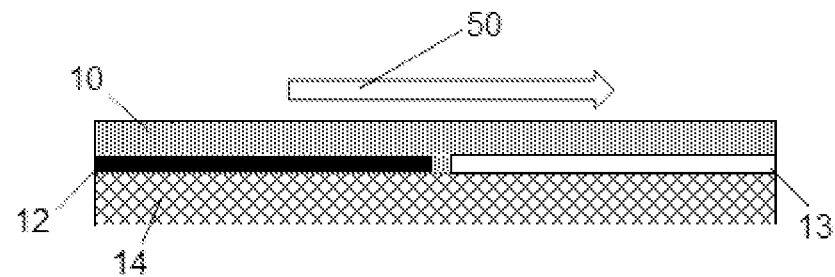
Figure 3:
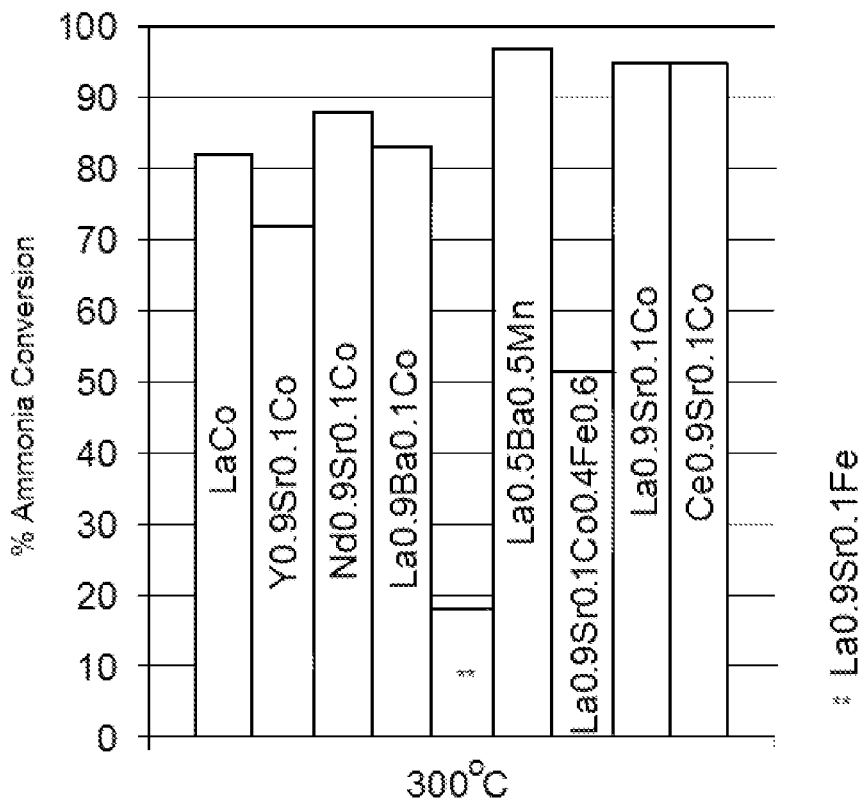
FIG. 3 is a graph illustrating the percentage of $NH_3$ conversion at 300° C. by LaCo and various perovskites.
Figure 4:
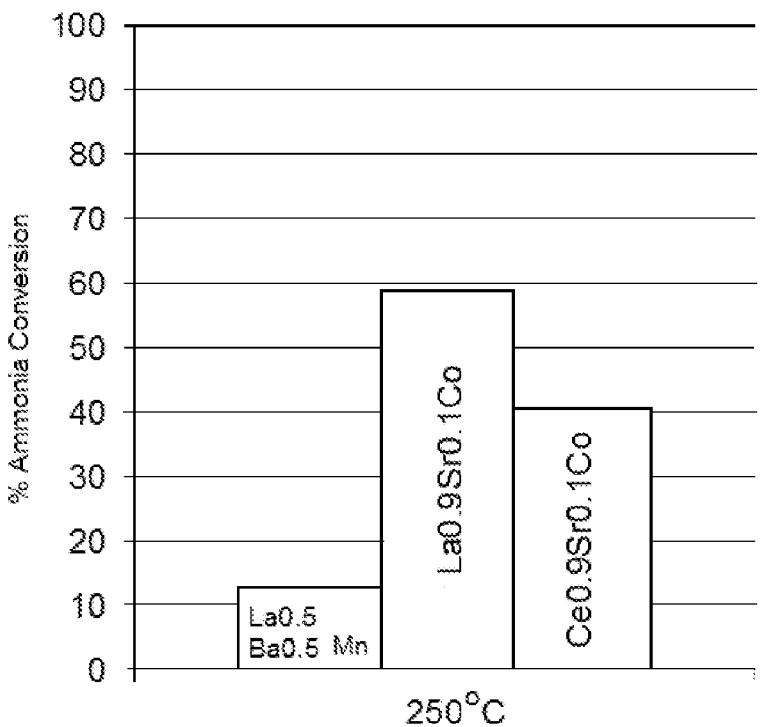
FIG. 4 is a graph illustrating the percentage of $NH_3$ conversion at 250° C. by $La_{0.5}Ba_{0.5}Mn$; $La_{0.9}Sr_{0.1}Co$; and $Ce_{0.9}Sr_{0.1}Co$.

FIG. 2D shows a configuration in which the SCR layer 10 comprising the SCR catalyst is positioned over the underlayer 12 which comprises a perovskite, and the oxidation layer 12 is positioned over the solid substrate 14. In FIG. 2A, both the SCR layer and the oxidation layer are positioned over the entire axial length of the substrate. The SCR layer 10 and the underlayer 12 which comprises a perovskite can be positioned over a portion of the axial length of the substrate, as shown in FIGS. 2D and 2E. In placing the SCR layer over the underlayer 12 which comprises a perovskite, a portion of the SCR washcoat can occupy some or all of the space between adjacent oxidation layers. FIG. 2F shows where all of the space between adjacent oxidation layers comprises one or more SCR catalyst. The space between adjacent oxidation layers can be completely filed with an SCR overlay that also fills the space between the oxidation layers, as shown in FIG. 2G. Generally, a catalyst layer of the present invention permeates the substrate; penetrates a portion of the substrate, for example a majority portion; coats the surface of the substrate; or a combination thereof. Alternatively to being coated on a substrate wall, the oxidation catalyst can be incorporated into a high porosity substrate, for example as an interior coating that permeates the wall or can be incorporated into extrudable paste which forms the substrate.

EXAMPLE 1

A series of compounds including LaCo and different perovskites were prepared and tested for ammonia oxidation activity as described below.

Each of the following compounds was prepared by forming a solution containing a nitrate of each metal: LaCo; $Y_{0.9}Sr_{0.1}Co$; $Nd_{0.9}Sr_{0.1}Co$; $LaY_{0.9}Ba_{0.1}Co$; $La_{0.9}Sr_{0.1}Fe$; $La_{0.5}Ba_{0.5}Mn$; $La_{0.9}Sr_{0.1}Co_{0.4}Fe_{0.6}$; $La_{0.9}Sr_{0.1}Co$; and $Ce_{0.9}Sr_{0.1}Co$. A mixed metal nitrate solution was prepared by added a metal nitrate of each of the metals in the desired compound to the solution with citric acid. The amount of each metal nitrate added to the solution was determined based upon the desired proportion of the metal in the final compound. The mixed metal nitrate solution was dried in an oven at 80° C., and then heated to 700° C. for 4 hours. The resulting material was ground and sieved through a #80 (180 micron) mesh.

The catalytic activity of each of these compounds for degrading ammonia at 300° C. was determined by passing a gas comprising 200 ppm ammonia, 12% oxygen, 4.5% $CO_2$ and 4.5% $H_2O$, with the remainder being nitrogen over the catalyst and measuring the amount of ammonia present before and after exposure to the catalyst. The amount of ammonia present in the gas was quantitated using Fourier transform infrared (FTIR) spectroscopy.

FIG. 1 show the % conversion of ammonia by each of the compounds at 300° C. Each of the compounds containing only cobalt as the B metal converted over 70% of the ammonia. In addition, the compound containing manganese converted over 95% of the ammonia. The two compounds containing iron and the compound containing a mixture of cobalt and iron as the B metal, converted about 18% and 52% of the ammonia, respectively. Each of the perovskites $La_{0.5}Ba_{0.5}Mn$; $La_{0.9}Sr_{0.1}Co$; and $Ce_{0.9}Sr_{0.1}Co$ converted 94% or greater of the ammonia. These tests demonstrate that perovskites having a number of different A and B metals can be used in converting ammonia at 300° C.

The three compounds that converted 94% or greater of the ammonia at 300° C. ($La_{0.5}Ba_{0.5}Mn$; $La_{0.9}Sr_{0.1}Co$; and $Ce_{0.9}Sr_{0.1}Co$) was tested to determine the conversion of ammonia at 250° C. under the same conditions. $La_{0.9}Sr_{0.1}Co$ was able convert about 60% of the ammonia at 250° C., $Ce_{0.9}Sr_{0.1}Co$ was able convert about 40% of the ammonia at 250° C., while $La_{0.5}Ba_{0.5}Mn$ was able to convert about 13% of the ammonia at 250° C.

These tests demonstrate that perovskites can be used in converting ammonia at 250° C.

EXAMPLE 2

Four different compositions were evaluated to determine their catalytic activity on ammonia degradation and $N_2$ selectivity.

Composition 1 had two layers, a bottom layer and a top layer, with the top layer being closest to the gas flow. The bottom layer comprised $La_{0.9}Sr_{0.1}CoO_3$, which had a composition of 51.9% La, 3.6% Sr, 24.5% Co. The bottom layer was prepared by applying a washcoat layer comprising $La_{0.9}Sr_{0.1}CoO_3$ to a cordierite substrate. The top layer comprised a copper exchanged chabezite and a binder, with the copper exchanged chabezite present at a loading of 1.95 g/in$^3$.

Composition 2 comprised only a layer of $La_{0.9}Sr_{0.1}CoO_3$, as described above.

Composition 3 had two layers, a bottom layer and a top layer, with the top layer being closest to the gas flow. The bottom layer, which comprised platinum, was prepared by applying a washcoat layer comprising platinum and a milled alumina to a cordierite substrate. The platinum loading was 1 g/ft$^3$. The top layer comprised a copper exchanged SAPO-34 and a binder, with the copper exchanged SAPO-34 present at a loading of 2.072 g/in$^3$.

Composition 4 combined the first composition and the third composition.

Compositions 1 and 2 were evaluated to determine ammonia conversion and $N_2$ selectivity by measuring the conversions in a gas comprising 200 ppm $NH_3$, 12% $O_2$, 4.5% $CO_2$, and 4.5% $H_2O$ in $N_2$, with a space velocity, SV, of 60,000/hr$^{-1}$. The amount of ammonia, NO, $NO_2$ and $N_2O$ present in the gas was quantitated using Fourier transform infrared (FTIR) spectroscopy. $N_2$ selectivity was calculated by the following formula:

$$N_2 = \frac{NH_3(i) - NH_3(o) - NO(o) - NO_2(o) - 2N_2O(o)}{NH_3(i) - NH_3(o)} \times 100\%$$

where $NH_3(i)$ is the amount of ammonia entering the system (prior to exposure to the compositions) and $NH_3(o)$, $NO(o)$, $NO_2(o)$ and $N_2O(o)$ are the amounts of the corresponding compounds leaving the system (after exposure to the compositions).

Figure 5A:
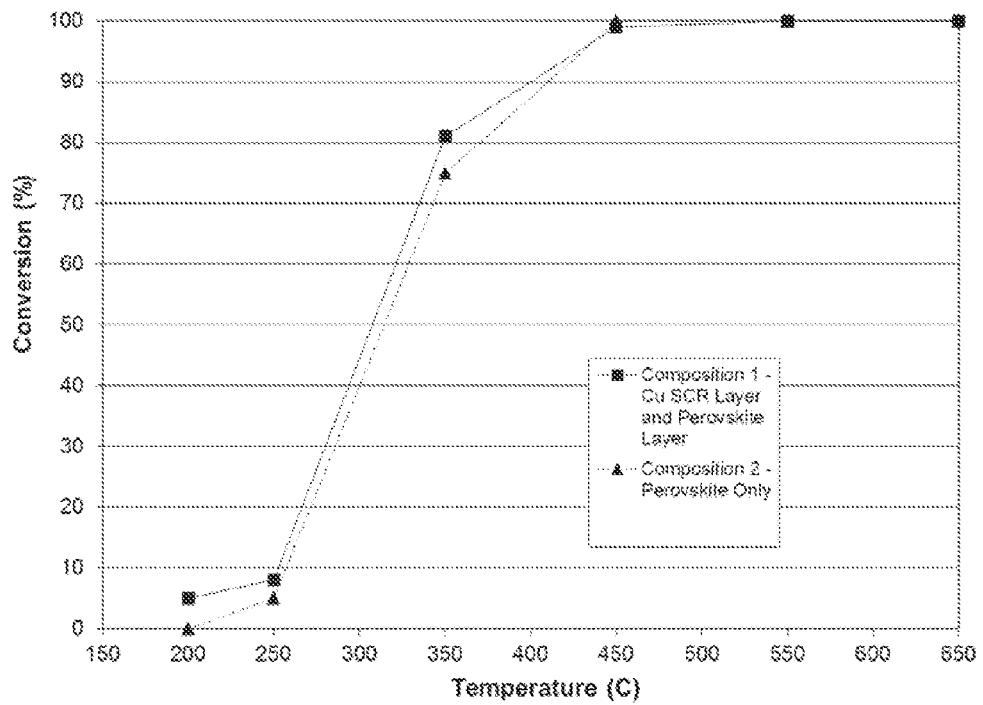
FIG. 5A is a graph illustrating $NH_3$ conversion using a composition comprising a Cu SCR top layer and a perovskite in a bottom layer.
Figure 5B:
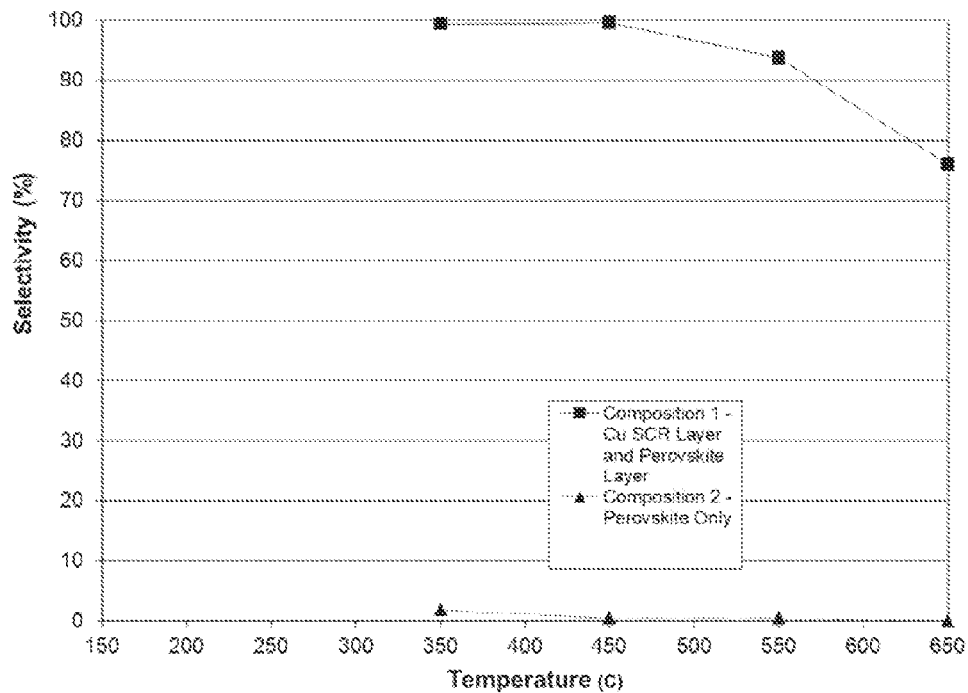
FIG. 5B is a graph illustrating $N_2$ selectivity using a composition comprising a Cu SCR top layer and a perovskite in a bottom layer.

FIG. 5A shows that at temperatures between 250 and 650° C., composition 1, having a Cu SCR top layer over a perovskite bottom layer, had approximately the same ammonia conversion as composition 2, which only contained a single perovskite layer. FIG. 5B shows that composition 1 provided much greater $N_2$ selectivity, with almost 100% $N_2$ selectivity between 350 and 450° C. and about 95% selectivity at 550 C. Even at 650 C, composition 1 provided about 75% $N_2$ selectivity. However, composition 2 provided less than 5% selectivity at temperatures of 350 to 650° C.

Compositions 1, 3 and 4 were evaluated to determine ammonia conversion and $N_2$ selectivity by measuring the conversions in a gas comprising 200 ppm $NH_3$, 12% $O_2$, 4.5% $CO_2$, and 4.5% $H_2O$ in $N_2$. A space velocity, SV, of 120,000/hr$^{-1}$ was used to evaluate compositions 1 and 3, but the system that combined the compositions of claims 1 and 3 used a space velocity of 60,000/hr$^{-1}$. The amount of ammonia NO, $NO_2$ and $N_2O$ present in the gas was quantitated using Fourier transform infrared (FTIR) spectroscopy. $N_2$ selectivity was calculated as described above.

Figure 6:
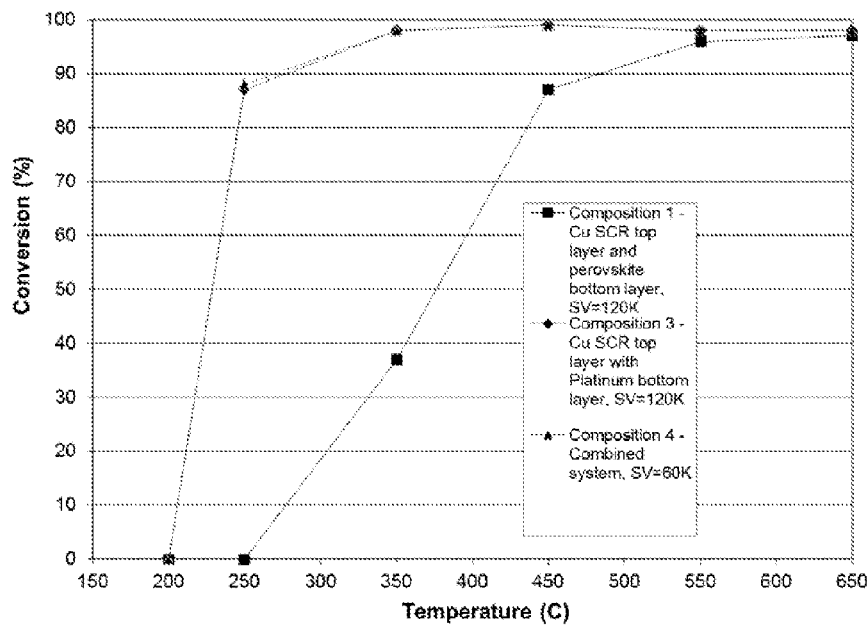
FIG. 6 is a graph illustrating $NH_3$ conversion using compositions comprising: (a) a Cu SCR top layer and a perovskite bottom later, (b) a Cu SCR top layer and a platinum bottom later, and (c) a combination of (a) and (b).
Figure 7:
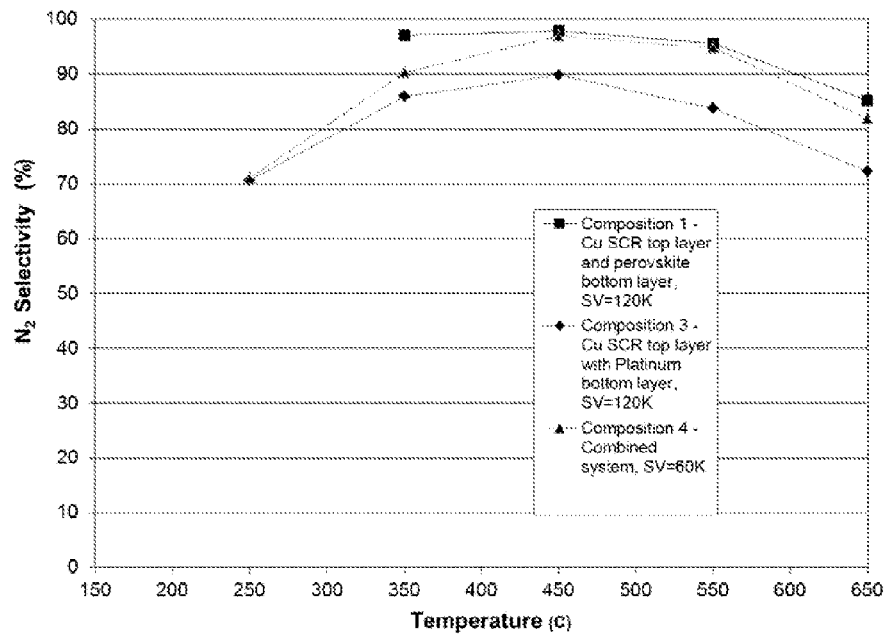
FIG. 7 is a graph illustrating $N_2$ selectivity using compositions comprising: (a) a Cu SCR top layer and a perovskite bottom later, (b) a Cu SCR top layer and a platinum bottom later, and (c) a combination of (a) and (b).

FIGS. 6 and 7 show that combination of an ammonia slip catalyst comprising an SCR catalyst in an overlayer and a perovskite in an underlayer, followed by a platinum catalyst downstream of the ammonia slip catalyst, provides good ammonia conversion while maintaining good $N_2$ selectivity over a wider temperature range than using only the ammonia slip catalyst or the platinum catalyst. The combination of an ammonia slip catalyst comprising an SCR catalyst in an overlayer and a perovskite in an underlayer, followed by a platinum catalyst downstream of the ammonia slip catalyst, shows very high $NH_3$ oxidation activity at temperature as low as 250° C. (see FIG. 6), while it also exhibits excellent $N_2$ selectivity across the whole temperature range; e.g. >90% at 550° C. (see FIG. 7). A system with a combination of an ammonia slip catalyst comprising an SCR catalyst in an overlayer and a perovskite in an underlayer, followed by a platinum catalyst downstream of the ammonia slip catalyst, provides high $NH_3$ oxidation activity and $N_2$ selectivity in a very wide temperature window. This combined system can improve the $N_2$ selectivity for $NH_3$ slip control compared to the current commercial PGM-ASC catalyst, allowing the engines to meet tighter emission regulations.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A catalyst article comprising:
   (a) a wall flow monolith having an inlet face end and an outlet face and an axis of gas flow from said inlet face to said outlet face;
   (b) a first composition comprising a layer A comprising a first SCR catalyst and a layer B comprising a perovskite, wherein layer A is arranged to contact an exhaust gas before layer B; and
   (c) a second composition comprising layer C comprising a second SCR catalyst and layer D comprising a precious group metal, wherein layer C is arranged to contact an exhaust gas before layer D;
   wherein the first and second compositions are disposed within a portion of the wall flow monolith and in series along the axis, and wherein said first composition is disposed proximal to the inlet face, and said second zone is disposed proximal to the outlet face.

2. The catalyst article of claim 1, wherein the first SCR catalyst and the second SCR catalyst are the same SCR catalyst.

3. The catalyst article of claim 1, wherein the first SCR catalyst and the second SCR catalyst are different SCR catalysts.

4. The catalyst article of claim 1, wherein layer A is an overlayer located over layer B.

5. The catalyst article of claim 1, wherein layer A is supported on a first support material and layer B is supported on a second support material.

6. The catalyst article of claim 1, wherein the first SCR catalyst comprises an oxide of a base metal, a molecular sieve, a metal exchanged molecular sieve or a mixture thereof.

7. The catalyst article of claim 6, wherein the base metal is selected from the group consisting of cerium (Ce), chromium (Cr), cobalt (Co), copper (Cu), iron (Fe), manganese (Mn), molybdenum (Mo), nickel (Ni), tungsten (W) and vanadium (V), and mixtures thereof.

8. The catalyst article of claim 1, wherein the first SCR catalyst comprises a metal exchanged molecular sieve and the metal is selected from the group consisting of calcium, cobalt, copper, gallium, indium, iron, nickel, silver and tin.

9. The catalyst article of claim 1, wherein the first SCR catalyst comprises a molecular sieve or a metal exchanged molecular sieve.

10. The catalyst article of claim 9, wherein the molecular sieve or the metal exchanged molecular sieve is small pore, medium pore or large pore sieve or a mixture thereof.

11. The catalyst article of claim 1, wherein the perovskite has the formula $ABO_3$, where A comprises at least one of calcium (Ca), barium (Ba), bismuth (Bi), cadmium (Cd), cerium (Ce), copper (Cu), lanthanum (La), lead (Pb), neodymium (Nd), nickel (Ni), strontium (Sr), and yttrium (Y), and B comprises at least one of aluminum (Al), cerium (Ce), chromium (Cr), cobalt (Co), iron (Fe), manganese (Mn), niobium (Nb), tin (Sn), titanium (Ti) and zirconium (Zr).

12. The catalyst article of claim 1, wherein the perovskite has the formula $LaCoO_3$, $LaMnO_3$, $La_YSr_{(1-Y)}CoO_3$, or $La_YSr_{(1-Y)}MnO_3$, where Y=0.6 to 1.0, inclusive.

13. The catalyst article of claim 1, wherein the perovskite has the formula $La_YSr_{(1-Y)}CoO_3$, where Y=0.6 to 1.0, inclusive, and the first SCR catalyst comprises a copper or iron exchanged molecular sieve.

14. The catalyst article of claim 1, wherein the perovskite is present at a concentration of about 0.2 to about 5.0 $g/in^3$.

15. The catalyst article of claim 1, wherein the first SCR catalyst is present at a concentration of about 0.2 to about 5.0 $g/in^3$.

16. The catalyst article of claim 1, wherein the first composition has at least 70% $N_2$ selectivity at a temperature between about 250° C. and about 650° C.

17. The catalyst article of claim 1, wherein the first composition has at least 80% $N_2$ selectivity at a temperature between about 250° C. and about 650° C.

18. An engine exhaust gas treatment system comprising: (a) a catalyst article according to claim 1; and (b) a source of ammonia or urea upstream of the catalytic article.

19. A method for treating an exhaust gas comprising contacting an exhaust gas stream having a concentration of NOx with a nitrogenous reductant at a temperature of about 150° C. to about 750° C. in the presence of a catalyst article according to claim 1.

20. A method for reducing NOx in an exhaust gas comprising contacting the gas with a catalyst article according to claim 1 for a time and temperature sufficient to reduce the level of NOx compounds in the gas.

* * * * *